(12) United States Patent
Chou et al.

(10) Patent No.: US 12,464,383 B2
(45) Date of Patent: Nov. 4, 2025

(54) PHYSICAL LAYER CELL IDENTIFIER (PCI) CONFIGURATION AND AUTOMATIC NEIGHBOR RELATIONS (ANR) FOR 5G NETWORKS

(71) Applicant: Apple Inc., Cupertino, CA (US)

(72) Inventors: Joey Chou, Scottsdale, AZ (US); Yizhi Yao, Chandler, AZ (US)

(73) Assignee: Apple Inc., Cupertino, CA (US)

(*) Notice: Subject to any disclaimer, the term of this patent is extended or adjusted under 35 U.S.C. 154(b) by 664 days.

(21) Appl. No.: 17/435,409

(22) PCT Filed: Mar. 27, 2020

(86) PCT No.: PCT/US2020/025169
§ 371 (c)(1),
(2) Date: Sep. 1, 2021

(87) PCT Pub. No.: WO2020/198571
PCT Pub. Date: Oct. 1, 2020

(65) Prior Publication Data
US 2022/0174519 A1    Jun. 2, 2022

Related U.S. Application Data

(60) Provisional application No. 62/825,616, filed on Mar. 28, 2019.

(51) Int. Cl.
*H04W 24/08* (2009.01)
*H04B 17/318* (2015.01)
(52) U.S. Cl.
CPC .......... *H04W 24/08* (2013.01); *H04B 17/318* (2015.01)

(58) Field of Classification Search
None
See application file for complete search history.

(56) References Cited

U.S. PATENT DOCUMENTS 9,723,535 B1 *   8/2017   Marupaduga ... H04W 36/00835
2009/0264130 A1 * 10/2009   Catovic ................. H04W 24/02
                                                            455/436
(Continued)

FOREIGN PATENT DOCUMENTS

KR    20060068309 A *  6/2006 ........... H04L 41/142
WO    WO-9934627 A1 *  7/1999 .......... H04W 36/302
(Continued)

OTHER PUBLICATIONS

PCT Search Report dated Sep. 15, 2020 in connection with PCT Application No. PCT/US2020/025169.
(Continued)

*Primary Examiner* — Christopher T Wyllie
(74) *Attorney, Agent, or Firm* — Eschweiler & Potashnik, LLC; Matthew W Glause

(57) ABSTRACT

Techniques discussed herein can facilitate one or more of improvements to Automatic Neighbor Relation(s) (ANR(s)) for cell(s) of a Radio Access Network (RAN), configuration of Physical-layer Cell Identifier(s) for cell(s) of the RAN, and/or end-to-end performance assurance for the RAN based on 5G QoS Identifier (5QI) targets and/or requirements. Various embodiments can employ one or more of the techniques discussed herein, for example, at a component or service of a Fifth Generation (5G) Core Network (5GC), a Third Generation Partnership Project (3GPP) Management System, or a node of a Radio Access Network (RAN).

20 Claims, 6 Drawing Sheets

(56) References Cited

U.S. PATENT DOCUMENTS

| | | | |
|---|---|---|---|
| 2012/0026918 A1* | 2/2012 | Won | H04W 36/0061 370/255 |
| 2012/0069732 A1* | 3/2012 | Xu | H04W 36/0058 370/242 |
| 2012/0122503 A1* | 5/2012 | Ma | H04W 16/10 455/501 |
| 2013/0107929 A1* | 5/2013 | Ma | H04B 17/345 375/225 |
| 2013/0316710 A1* | 11/2013 | Maaref | H04W 24/02 455/436 |
| 2014/0106738 A1* | 4/2014 | Ostrup | H04W 24/02 455/422.1 |
| 2015/0038089 A1 | 2/2015 | Brunel et al. | |
| 2015/0092552 A1* | 4/2015 | Baj | H04W 28/0808 370/254 |
| 2015/0148040 A1* | 5/2015 | Ehrlich | H04W 24/02 455/436 |
| 2016/0088536 A1 | 3/2016 | Zingler et al. | |
| 2016/0150453 A1* | 5/2016 | Narayanan | H04W 36/0061 455/436 |
| 2016/0157114 A1* | 6/2016 | Kalderen | H04W 24/08 370/252 |
| 2016/0234733 A1* | 8/2016 | Sasanapuri | H04W 36/0061 |
| 2016/0353364 A1* | 12/2016 | Pasupuleti | H04W 48/16 |
| 2017/0026856 A1 | 1/2017 | Thomas et al. | |
| 2017/0238243 A1 | 8/2017 | Park et al. | |
| 2017/0272354 A1 | 9/2017 | Chen | |
| 2017/0359737 A1 | 12/2017 | Singh et al. | |
| 2018/0063692 A1 | 3/2018 | Ramachandra et al. | |
| 2018/0249430 A1 | 8/2018 | Moosavi et al. | |
| 2019/0132778 A1* | 5/2019 | Park | H04W 16/28 |
| 2020/0404555 A1* | 12/2020 | Ökvist | H04W 48/08 |
| 2022/0174519 A1* | 6/2022 | Chou | H04W 24/08 |
| 2024/0224138 A1* | 7/2024 | Höykinpuro | H04W 36/0079 |

FOREIGN PATENT DOCUMENTS

| | | | |
|---|---|---|---|
| WO | 20120148764 A1 | | 11/2012 |
| WO | 20160154604 A1 | | 9/2016 |
| WO | WO-2020217486 A1 | * | 10/2020 ............ H04W 16/26 |

OTHER PUBLICATIONS

PCT Written Opinion dated Sep. 15, 2020 in connection with PCT Application No. PCT/US2020/025169.

"3rd Generation Partnership Project; Technical Specification Group Services and System Aspects; Telecommunication management; Study on integration of ONAP and 3GPP management for 5G networks (Release 16)" 3GPP Standard; F-06921; vol. SA WG5; Dec. 18, 2018; pp. 1-36, XP051591170.

T-Mobile et al; "SON use-case: Neighbour Relationship optimisation" 3GPP Draft; R3-071601; vol. Ran WG3; Aug. 27, 2007; Whole Document; XP050162413.

Intel et al: "pCR 28.803 solution for ANR optimization" 3GPP Draft; S5-193114; vol. SA WG5; Apr. 2, 2019; URL: http://www.3gpp.org/ftp/tsg%5Fsa/WG5%5FTM/TSGS5%5F125/Docs/S5%2D193114%2Ezip.

"3rd Generation Partnership Project; Technical Specification Group Services and System Aspects; Management and orchestration; 5G performance measurements (Release 16)" 3GPP Draft; 28552-G10; vol. SA WG5; Mar. 25, 2019; URL:http://www.3gpp.org/ftp/tsg%5Fsa/WG5%5FTM/TSGS5%5F124/SA%5F83.

"3rd Generation Partnership Project; Technical Specification Group Services and System Aspects; Management and orchestration; 5G end to end Key Performance Indicators (KPI) (Release 16)" 3GPP; 28554-G00; vol. SA WG5; Mar. 25, 2019; URL:http://www.3gpp.org/ftp/tsg%5Fsa/WG5%5FTM/TSGS5%5F124/SA%5F83.

"3rd Generation Partnership Project; Technical Specification Group Services and System Aspects; Management and orchestration; Performance assurance" 3GPP Draft; 28550-G00; vol. SA WG5; Mar. 25, 2019; URL:http://www.3gpp.org/ftp/tsg%5Fsa/WG5%5FTM/TSGS5%5F124/SA%5F83.

Intel: "pCR 28.803 add a solution for end-to-end performance assurance" 3GPP Draft; S5-193110; vol. SA WG5; Apr. 2, 2019; URL:http://www.3gpp.org/ftp/tsg%5Fsa/WG5%5FTM/TSGS5%5F125/Docs/S5%2D193110%2Ezip.

3rd Generation Partnership Project; "Technical Specification Group Services and System Aspects; Telecommunication management; Study on integration of ONAP and 3GPP management for 5G networks"; (Release 16);3GPP TR 28.900 V1.0.1; Dec. 2018.

3rd Generation Partnership Project; "Technical Specification Group Radio Access Network; NR; Physical channels and modulation"; (Release 15); 3GPP TS 38.211 V15.5.0; Mar. 2019.

3rd Generation Partnership Project; Technical Specification Group Radio Access Network; NR; Radio Resource Control (RRC) protocol specification (Release 15); 3GPP TS 38.331 V15.4.0 (Dec. 2018); http://www.3gpp.org.

International Preliminary Report on Patentability dated September 28 202, in connection with PCT Application No. PCT/US2020/025169.

* cited by examiner

PHYSICAL LAYER CELL IDENTIFIER (PCI) CONFIGURATION AND AUTOMATIC NEIGHBOR RELATIONS (ANR) FOR 5G NETWORKS

CROSS REFERENCE TO RELATED APPLICATIONS

This application is a National Phase entry application of International Patent Application No. PCT/US2020/025169 filed Mar. 27, 2020, which claims priority to U.S. Provisional Patent Application No. 62/825,616 filed on Mar. 28, 2019, entitled "SYSTEM AND METHOD FOR BEAM FAILURE RECOVERY," which is incorporated herein by reference for all purposes.

BACKGROUND

The management of neighboring relations among base stations to support handover is one of the most labor-intensive management tasks in cellular networks. Such tasks are even more complicated, as every new generation (e.g., Third Generation (3G), Fourth Generation (4G), Fifth Generation (5G), and so forth) of cellular networks is added to the networks of operators. Due to the size of radio networks, with several hundred thousand neighbor relations for a single operator, it is a huge task to maintain these neighbor relations manually. Automatic Neighbor Relation (ANR) management is a mechanism that automatically creates and updates the neighbor relations that can generate the biggest saving in resource utilization for mobile operators.

Each Radio Access Network (RAN) node (e.g., eNB, gNB, etc.) is assigned a Physical-layer Cell Identifier (PCI) that is broadcast in a Primary Synchronization Signal (PSS) and Secondary Synchronization Signal (SSS). When a UE receives PSS and SSS to acquire time and frequency synchronization, it also obtains the PCI that is used to uniquely identify a New Radio (NR) cell. There are 1008 unique PCIs (see, e.g., clause 7.4.2 in Third Generation Partnership Project (3GPP) Technical Specification (TS) 38.211). Therefore, PCIs need to be reused, as massive numbers of NR cells and small cells operating in millimeter wave (mmWave) bands are deployed.

DETAILED DESCRIPTION

Figure 1:
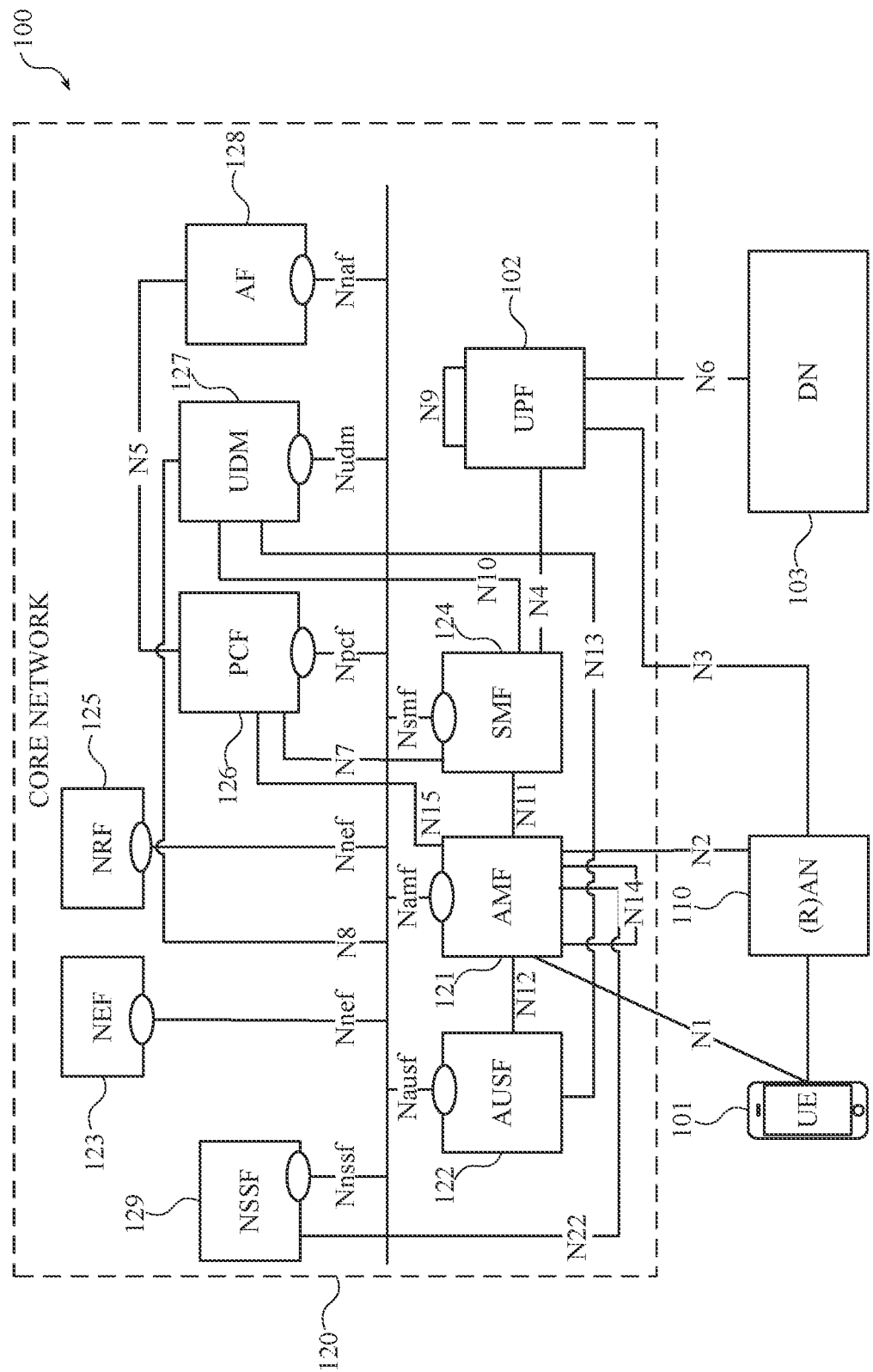
FIG. 1 is a block diagram illustrating an architecture of a system including a Core Network (CN), for example a Fifth Generation (5G) CN (5GC), in accordance with various embodiments.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone or other device configured to communicate via a 3GPP RAN, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more," unless the context indicates otherwise (e.g., "the empty set," "a set of two or more Xs," etc.).

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context may indicate that they are distinct or that they are the same.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

Various aspects discussed herein can relate to facilitating wireless communication, and the nature of these communications can vary.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments described herein can be implemented into a system using any suitably configured hardware and/or software. FIG. 1 illustrates an architecture of a system 100 including a Core Network (CN) 120, first through twenty-fourth additional examples for example a Fifth Generation (5G) CN (5GC), in accordance with various embodiments. The system 100 is shown to include a UE 101, which can be the same or similar to one or more other UEs discussed herein; a Third Generation Partnership Project (3GPP) Radio Access Network (Radio AN or RAN) or other (e.g., non-3GPP) AN, (R)AN 110, which can include one or more RAN nodes such as a base station (e.g., Evolved Node B(s) (eNB(s)), next generation Node B(s) (gNB(s), and/or other nodes) or other nodes or access points; and a Data Network (DN) 103, which can be, for example, operator services, Internet access or third party services; and a Fifth Generation Core Network (5GC) 120. The 5GC 120 can comprise one or more of the following functions and network components: an Authentication Server Function (AUSF) 122; an Access and Mobility Management Function (AMF) 121; a Session Management Function (SMF) 124; a Network Exposure Function (NEF) 123; a Policy Control Function (PCF) 126; a Network Repository Function (NRF) 125; a Unified Data Management (UDM) 127; an Application Function (AF) 128; a User Plane (UP) Function (UPF) 102; and a Network Slice Selection Function (NSSF) 129.

The UPF 102 can act as an anchor point for intra-RAT (Radio Access Technology) and inter-RAT mobility, an external Protocol Data Unit (PDU) session point of interconnect to DN 103, and a branching point to support multi-homed PDU session. The UPF 102 can also perform packet routing and forwarding, perform packet inspection, enforce the user plane part of policy rules, lawfully intercept packets (UP collection), perform traffic usage reporting, perform QoS handling for a user plane (e.g., packet filtering, gating, Uplink (UL)/Downlink (DL) rate enforcement), perform Uplink Traffic verification (e.g., Service Data Flow (SDF) to QoS flow mapping), transport level packet marking in the uplink and downlink, and perform downlink packet buffering and downlink data notification triggering. UPF 102 can include an uplink classifier to support routing traffic flows to a data network. The DN 103 can represent various network operator services, Internet access, or third-party services. DN 103 can include, or be similar to, an application server. The UPF 102 can interact with the SMF 124 via an N4 reference point between the SMF 124 and the UPF 102.

The AUSF 122 can store data for authentication of UE 101 and handle authentication-related functionality. The AUSF 122 can facilitate a common authentication framework for various access types. The AUSF 122 can communicate with the AMF 121 via an N12 reference point between the AMF 121 and the AUSF 122; and can communicate with the UDM 127 via an N13 reference point between the UDM 127 and the AUSF 122. Additionally, the AUSF 122 can exhibit a Nausf service-based interface.

The AMF 121 can be responsible for registration management (e.g., for registering UE 101, etc.), connection management, reachability management, mobility management, and lawful interception of AMF-related events, and access authentication and authorization. The AMF 121 can be a termination point for the N11 reference point between the AMF 121 and the SMF 124. The AMF 121 can provide transport for SM messages between the UE 101 and the SMF 124, and act as a transparent proxy for routing SM messages. AMF 121 can also provide transport for SMS messages between UE 101 and a Short Message Service (SMS) Function (SMSF) (not shown in FIG. 1). AMF 121 can act as SEcurity Anchor Function (SEAF), which can include interaction with the AUSF 122 and the UE 101 and/or receipt of an intermediate key that was established as a result of the UE 101 authentication process. Where Universal Subscriber Identity Module (USIM) based authentication is used, the AMF 121 can retrieve the security material from the AUSF 122. AMF 121 can also include a Single-Connection Mode (SCM) function, which receives a key from the SEA that it uses to derive access-network specific keys. Furthermore, AMF 121 can be a termination point of a RAN Control Plane (CP) interface, which can include or be an N2 reference point between the (R)AN 110 and the AMF 121; and the AMF 121 can be a termination point of Non Access Stratum (NAS) (N1) signaling, and perform NAS ciphering and integrity protection.

AMF 121 can also support NAS signaling with a UE 101 over an Non-3GPP (N3) Inter Working Function (IWF) interface. The N3IWF can be used to provide access to untrusted entities. N3IWF can be a termination point for the N2 interface between the (R)AN 110 and the AMF 121 for the control plane, and can be a termination point for the N3 reference point between the (R)AN 110 and the UPF 102 for the user plane. As such, the AMF 121 can handle N2 signaling from the SMF 124 and the AMF 121 for PDU sessions and QoS, encapsulate/de-encapsulate packets for Internet Protocol (IP) Security (IPSec) and N3 tunneling, mark N3 user-plane packets in the uplink, and enforce QoS corresponding to N3 packet marking taking into account QoS requirements associated with such marking received over N2. N3IWF can also relay uplink and downlink control-plane NAS signaling between the UE 101 and AMF 121 via an N1 reference point between the UE 101 and the AMF 121, and relay uplink and downlink user-plane packets between the UE 101 and UPF 102. The N3IWF also provides mechanisms for IPsec tunnel establishment with the UE 101. The AMF 121 can exhibit an Namf service-based interface, and can be a termination point for an N14 reference point between two AMFs 121 and an N17 reference point between the AMF 121 and a 5G Equipment Identity Register (5G-EIR) (not shown in FIG. 1).

The UE 101 can be registered with the AMF 121 in order to receive network services. Registration Management (RM) is used to register or deregister the UE 101 with the network (e.g., AMF 121), and establish a UE context in the network (e.g., AMF 121). The UE 101 can operate in an RM-REGISTERED state or an RM-DEREGISTERED state. In the RM-DEREGISTERED state, the UE 101 is not registered with the network, and the UE context in AMF 121 holds no valid location or routing information for the UE 101 so the UE 101 is not reachable by the AMF 121. In the RM-REGISTERED state, the UE 101 is registered with the network, and the UE context in AMF 121 can hold a valid location or routing information for the UE 101 so the UE 101 is reachable by the AMF 121. In the RM-REGISTERED state, the UE 101 can perform mobility Registration Update procedures, perform periodic Registration Update procedures triggered by expiration of the periodic update timer (e.g., to notify the network that the UE 101 is still active), and perform a Registration Update procedure to update UE capability information or to re-negotiate protocol parameters with the network, among others.

The AMF 121 can store one or more RM contexts for the UE 101, where each RM context is associated with a specific access to the network. The RM context can be a data structure, database object, etc. that indicates or stores, inter alia, a registration state per access type and the periodic update timer. The AMF 121 can also store a 5GC Mobility Management (MM) context that can be the same or similar to an (Enhanced Packet System (EPS))MM ((E)MM) context. In various embodiments, the AMF 121 can store a Coverage Enhancement (CE) mode B Restriction parameter of the UE 101 in an associated MM context or RM context. The AMF 121 can also derive the value, when needed, from the UE's usage setting parameter already stored in the UE context (and/or MM/RM context).

Connection Management (CM) can be used to establish and release a signaling connection between the UE 101 and the AMF 121 over the N1 interface. The signaling connection is used to enable NAS signaling exchange between the UE 101 and the CN 120, and comprises both the signaling connection between the UE and the AN (e.g., RRC connection or UE-N3IWF connection for non-3GPP access) and the N2 connection for the UE 101 between the AN (e.g., RAN 110) and the AMF 121. The UE 101 can operate in one of two CM states, CM-IDLE mode or CM-CONNECTED mode. When the UE 101 is operating in the CM-IDLE state/mode, the UE 101 may have no NAS signaling connection established with the AMF 121 over the N1 interface, and there can be (R)AN 110 signaling connection (e.g., N2 and/or N3 connections) for the UE 101. When the UE 101 is operating in the CM-CONNECTED state/mode, the UE 101 can have an established NAS signaling connection with the AMF 121 over the N1 interface, and there can be a (R)AN 110 signaling connection (e.g., N2 and/or N3 connections) for the UE 101. Establishment of an N2 connection between the (R)AN 110 and the AMF 121 can cause the UE 101 to transition from CM-IDLE mode to CM-CONNECTED mode, and the UE 101 can transition from the CM-CONNECTED mode to the CM-IDLE mode when N2 signaling between the (R)AN 110 and the AMF 121 is released.

The SMF 124 can be responsible for Session Management (SM) (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to Lawful Interception (LI) system); termination of SM parts of NAS messages; downlink data notification; initiating AN specific SM information, sent via AMF over N2 to AN; and determining Session and Service Continuity (SSC) mode of a session. SM can refer to management of a PDU session, and a PDU session or "session" can refer to a PDU connectivity service that provides or enables the exchange of PDUs between a UE 101 and a data network (DN) 103 identified by a Data Network Name (DNN). PDU sessions can be established upon UE 101 request, modified upon UE 101 and 5GC 120 request, and released upon UE 101 and 5GC 120 request using NAS SM signaling exchanged over the N1 reference point between the UE 101 and the SMF 124. Upon request from an application server, the 5GC 120 can trigger a specific application in the UE 101. In response to receipt of the trigger message, the UE 101 can pass the trigger message (or relevant parts/information of the trigger message) to one or more identified applications in the UE 101. The identified application(s) in the UE 101 can establish a PDU session to a specific DNN. The SMF 124 can check whether the UE 101 requests are compliant with user subscription information associated with the UE 101. In this regard, the SMF 124 can retrieve and/or request to receive update notifications on SMF 124 level subscription data from the UDM 127.

The SMF 124 can include the following roaming functionality: handling local enforcement to apply QoS Service Level Agreements (SLAs) (Visited Public Land Mobile Network (VPLMN)); charging data collection and charging interface (VPLMN); lawful intercept (in VPLMN for SM events and interface to LI system); and support for interaction with external DN for transport of signaling for PDU session authorization/authentication by external DN. An N16 reference point between two SMFs 124 can be included in the system 100, which can be between another SMF 124 in a visited network and the SMF 124 in the home network in roaming scenarios. Additionally, the SMF 124 can exhibit the Nsmf service-based interface.

The NEF 123 can provide means for securely exposing the services and capabilities provided by 3GPP network functions for third party, internal exposure/re-exposure, Application Functions (e.g., AF 128), edge computing or fog computing systems, etc. In such embodiments, the NEF 123 can authenticate, authorize, and/or throttle the AFs. NEF 123 can also translate information exchanged with the AF 128 and information exchanged with internal network functions. For example, the NEF 123 can translate between an AF-Service-Identifier and an internal 5GC information. NEF 123 can also receive information from other network functions (NFs) based on exposed capabilities of other network functions. This information can be stored at the NEF 123 as structured data, or at a data storage NF using standardized interfaces. The stored information can then be re-exposed by the NEF 123 to other NFs and AFs, and/or used for other purposes such as analytics. Additionally, the NEF 123 can exhibit an Nnef service-based interface.

The NRF 125 can support service discovery functions, receive NF discovery requests from NF instances, and provide the information of the discovered NF instances to the NF instances. NRF 125 also maintains information of available NF instances and their supported services. As used herein, the terms "instantiate," "instantiation," and the like can refer to the creation of an instance, and an "instance" can refer to a concrete occurrence of an object, which can occur, for example, during execution of program code. Additionally, the NRF 125 can exhibit the Nnrf service-based interface.

The PCF 126 can provide policy rules to control plane function(s) to enforce them, and can also support unified policy framework to govern network behavior. The PCF 126 can also implement an FE to access subscription information relevant for policy decisions in a UDR of the UDM 127. The PCF 126 can communicate with the AMF 121 via an N15 reference point between the PCF 126 and the AMF 121, which can include a PCF 126 in a visited network and the AMF 121 in case of roaming scenarios. The PCF 126 can communicate with the AF 128 via an N5 reference point between the PCF 126 and the AF 128; and with the SMF 124 via an N7 reference point between the PCF 126 and the SMF 124. The system 100 and/or CN 120 can also include an N24 reference point between the PCF 126 (in the home network) and a PCF 126 in a visited network. Additionally, the PCF 126 can exhibit an Npcf service-based interface.

The UDM 127 can handle subscription-related information to support the network entities' handling of communication sessions, and can store subscription data of UE 101. For example, subscription data can be communicated between the UDM 127 and the AMF 121 via an N8 reference point between the UDM 127 and the AMF. The UDM 127 can include two parts, an application Functional Entity (FE) and a Unified Data Repository (UDR) (the FE and UDR are not shown in FIG. 1). The UDR can store subscription data and policy data for the UDM 127 and the PCF 126, and/or structured data for exposure and application data (including Packet Flow Descriptions (PFDs) for application detection, application request information for multiple UEs 101) for the NEF 123. The Nudr service-based interface can be exhibited by the UDR 221 to allow the UDM 127, PCF 126, and NEF 123 to access a particular set of the stored data, as well as to read, update (e.g., add, modify), delete, and subscribe to notification of relevant data changes in the UDR. The UDM can include a UDM-FE, which is in charge of processing credentials, location management, subscription management and so on. Several different FEs can serve the same user in different transactions. The UDM-FE accesses subscription information stored in the UDR and performs authentication credential processing, user identification handling, access authorization, registration/mobility management, and subscription management. The UDR can interact with the SMF 124 via an N10 reference point between the UDM 127 and the SMF 124. UDM 127 can also support SMS management, wherein an SMS-FE implements similar application logic as discussed elsewhere herein. Additionally, the UDM 127 can exhibit the Nudm service-based interface.

The AF 128 can provide application influence on traffic routing, provide access to NEF 123, and interact with the policy framework for policy control. 5GC 120 and AF 128 can provide information to each other via NEF 123, which can be used for edge computing implementations. In such implementations, the network operator and third party services can be hosted close to the UE 101 access point of attachment to achieve an efficient service delivery through the reduced end-to-end latency and load on the transport network. For edge computing implementations, the 5GC can select a UPF 102 close to the UE 101 and execute traffic steering from the UPF 102 to DN 103 via the N6 interface. This can be based on the UE subscription data, UE location, and information provided by the AF 128. In this way, the AF 128 can influence UPF (re)selection and traffic routing. Based on operator deployment, when AF 128 is considered to be a trusted entity, the network operator can permit AF 128 to interact directly with relevant NFs. Additionally, the AF 128 can exhibit an Naf service-based interface.

The NSSF 129 can select a set of network slice instances serving the UE 101. The NSSF 129 can also determine allowed Network Slice Selection Assistance Information (NSSAI) and the mapping to the subscribed Single NSSAIs (S-NSSAIs), as appropriate. The NSSF 129 can also determine the AMF set to be used to serve the UE 101, or a list of candidate AMF(s) 121 based on a suitable configuration and possibly by querying the NRF 125. The selection of a set of network slice instances for the UE 101 can be triggered by the AMF 121 with which the UE 101 is registered by interacting with the NSSF 129, which can lead to a change of AMF 121. The NSSF 129 can interact with the AMF 121 via an N22 reference point between AMF 121 and NSSF 129; and can communicate with another NSSF 129 in a visited network via an N31 reference point (not shown in FIG. 1). Additionally, the NSSF 129 can exhibit an Nnssf service-based interface.

As discussed previously, the CN 120 can include an SMSF, which can be responsible for SMS subscription checking and verification, and relaying SM messages to/from the UE 101 to/from other entities, such as an SMS-Gateway Mobile services Switching Center (GMSC)/Inter-Working MSC (IWMSC)/SMS-router. The SMSF can also interact with AMF 121 and UDM 127 for a notification procedure that the UE 101 is available for SMS transfer (e.g., set a UE not reachable flag, and notifying UDM 127 when UE 101 is available for SMS).

The CN 120 can also include other elements that are not shown in FIG. 1, such as a Data Storage system/architecture, a 5G-EIR, a Security Edge Protection Proxy (SEPP), and the like. The Data Storage system can include a Structured Data Storage Function (SDSF), an Unstructured Data Storage Function (UDSF), and/or the like. Any NF can store and retrieve unstructured data into/from the UDSF (e.g., UE contexts), via N18 reference point between any NF and the UDSF (not shown in FIG. 1). Individual NFs can share a UDSF for storing their respective unstructured data or individual NFs can each have their own UDSF located at or near the individual NFs. Additionally, the UDSF can exhibit an Nudsf service-based interface (not shown in FIG. 1). The 5G-EIR can be an NF that checks the status of Permanent Equipment Identifier (PEI) for determining whether particular equipment/entities are blacklisted from the network; and the SEPP can be a non-transparent proxy that performs topology hiding, message filtering, and policing on inter-PLMN control plane interfaces.

Additionally, there can be many more reference points and/or service-based interfaces between the NF services in the NFs; however, these interfaces and reference points have been omitted from FIG. 1 for clarity. In one example, the CN 120 can include an Nx interface, which is an inter-CN interface between the MME (e.g., a non-5G MME) and the AMF 121 in order to enable interworking between CN 120 and a non-5G CN. Other example interfaces/reference points can include an N5g-EIR service-based interface exhibited by a 5G-EIR, an N27 reference point between the Network Repository Function (NRF) in the visited network and the NRF in the home network; and an N31 reference point between the NSSF in the visited network and the NSSF in the home network.

Figure 2:
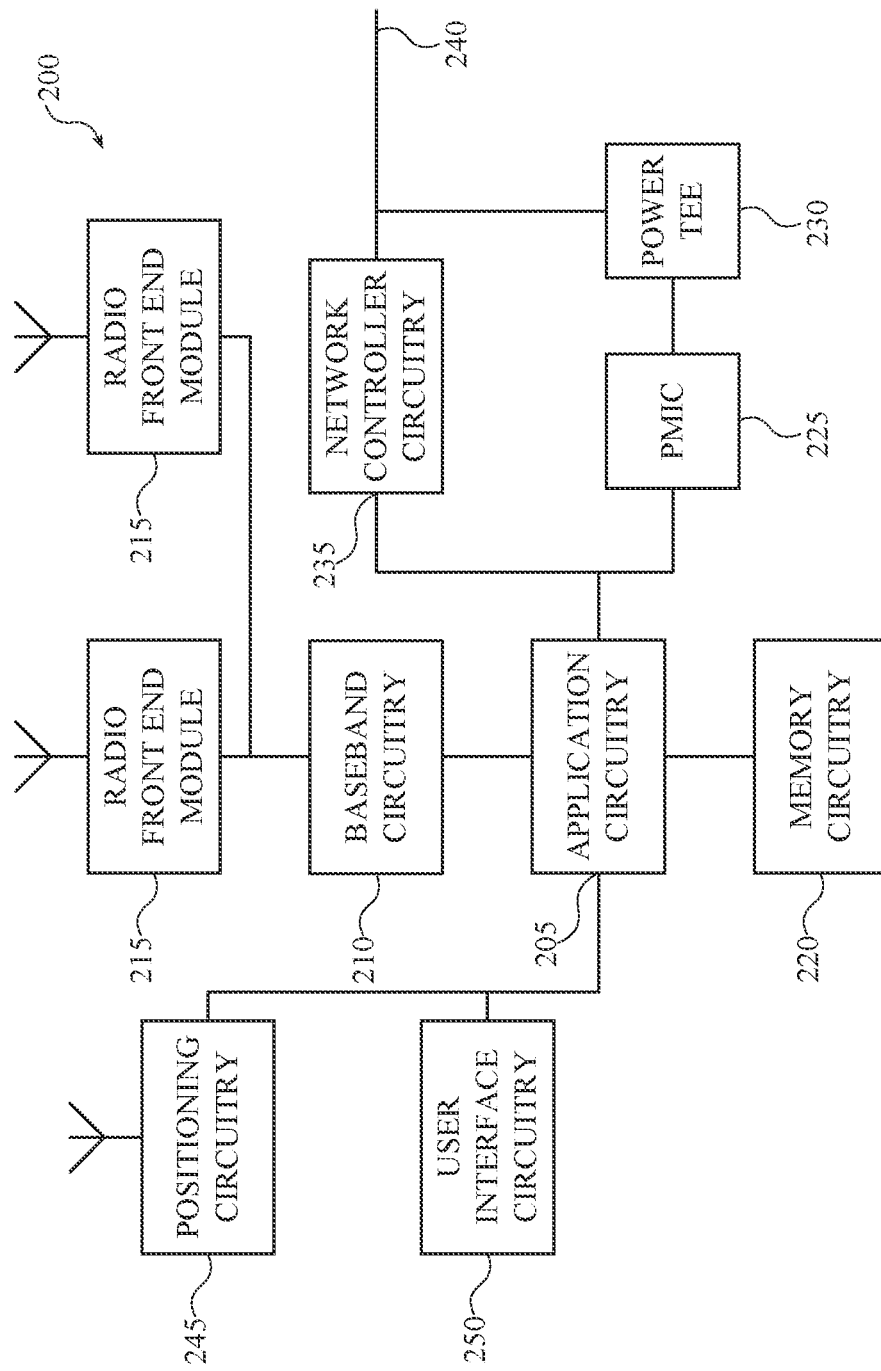
FIG. 2 is a diagram illustrating example components of an infrastructure equipment device such as a base station (BS) that can be employed in accordance with various aspects discussed herein.

Referring to FIG. 2, illustrated are example components of an infrastructure equipment device 200 in accordance with some embodiments. The infrastructure equipment 200 (or "system 200") can be implemented as a base station (e.g., eNB, gNB, etc.), radio head, RAN node such as a node of RAN 110 shown and described previously, another access point (AP) or base station (BS), application server(s), and/or any other element/device discussed herein. In other examples, the system 200 could be implemented in or by a UE.

The system 200 includes application circuitry 205, baseband circuitry 210, one or more radio front end modules (RFEMs) 215, memory circuitry 220, power management integrated circuitry (PMIC) 225, power tee circuitry 230, network controller circuitry 235, network interface connector 240, satellite positioning circuitry 245, and user interface 250. In some embodiments, the device 200 can include additional elements such as, for example, memory/storage, display, camera, sensor, or input/output (I/O) interface. In other embodiments, the components described below can be included in more than one device. For example, said circuitries can be separately included in more than one device for CRAN, vBBU, or other like implementations.

Application circuitry 205 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 205 can be coupled with or can include memory/storage elements and can be configured to execute instructions stored in the memory/storage to enable various applications or operating systems to run on the system 200. In some implementations, the memory/storage elements can be on-chip memory circuitry, which can include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 205 can include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 205 can comprise, or can be, a special-purpose processor/controller to operate according to the various embodiments herein. As examples, the processor(s) of application circuitry 205 can include one or more APPLE® processors, INTEL® processor(s); Advanced Micro Devices (AMD) RYZEN® processor(s), Accelerated Processing Units (APUs), or EPYC® processors; ARM-based processor(s) licensed from ARM Holdings, Ltd. such as the ARM Cortex-A family of processors and the THUNDERX2® provided by Cavium™, Inc.; a MIPS-based design from MIPS Technologies, Inc. such as MIPS Warrior P-class processors; and/or the like. In some embodiments, the system 200 may not utilize application circuitry 205, and instead can include a special-purpose processor/controller to process IP data received from an EPC or 5GC, for example.

User interface circuitry 250 can include one or more user interfaces designed to enable user interaction with the system 200 or peripheral component interfaces designed to enable peripheral component interaction with the system 200. User interfaces can include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces can include, but are not limited to, a nonvolatile memory port, a universal serial bus (USB) port, an audio jack, a power supply interface, etc.

The components shown by FIG. 2 can communicate with one another using interface circuitry, which can include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX can be a proprietary bus, for example, used in a SoC based system. Other bus/IX systems can be included, such as an I2C interface, an SPI interface, point to point interfaces, and a power bus, among others.

Figure 3:
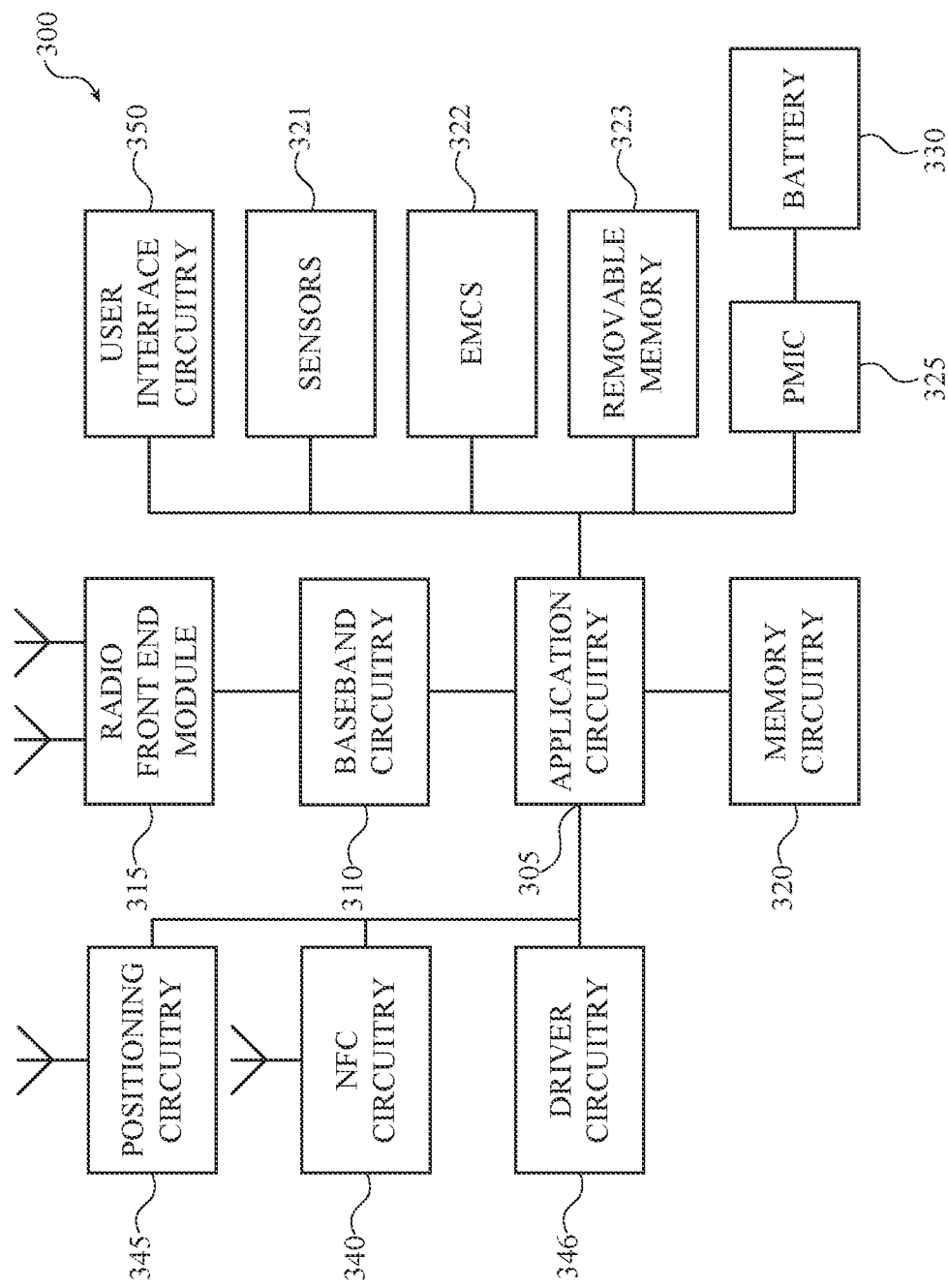
FIG. 3 is a diagram illustrating example components of a user equipment (UE) device that can be employed in accordance with various aspects discussed herein.

Referring to FIG. 3, illustrated is an example of a platform 300 (or "device 300") in accordance with various embodiments. In embodiments, the computer platform 1400 can be suitable for use as UEs 101 and/or any other element/device discussed herein. The platform 300 can include any combinations of the components shown in the example. The components of platform 300 can be implemented as integrated circuits (ICs), portions thereof, discrete electronic devices, or other modules, logic, hardware, software, firmware, or a combination thereof adapted in the computer platform 300, or as components otherwise incorporated within a chassis of a larger system. The block diagram of FIG. 3 is intended to show a high-level view of components of the computer platform 300. However, some of the components shown can be omitted, additional components can be present, and different arrangement of the components shown can occur in other implementations.

Application circuitry 305 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 305 can be coupled with or can include memory/storage elements and can be configured to execute instructions stored in the memory/storage to enable various applications or operating systems to run on the system 300. In some implementations, the memory/storage elements can be on-chip memory circuitry, which can include any suitable volatile and/or non-volatile memory, such as DRAM, SRAM, EPROM, EEPROM, Flash memory, solid-state memory, and/or any other type of memory device technology, such as those discussed herein.

As examples, the processor(s) of application circuitry 305 can include a general or special purpose processor, such as an A-series processor (e.g., the A13 Bionic), available from APPLE Inc., Cupertino, CA or any other such processor. The processors of the application circuitry 305 can also be one or more of Advanced Micro Devices (AMD) RYZEN® processor(s) or Accelerated Processing Units (APUs); Core processor(s) from INTEL Inc., SNAPDRAGON™ processor(s) from Qualcomm Technologies, Inc., Texas Instruments, Inc. Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 305 can be a part of a system on a chip (SoC) in which the application circuitry 305 and other components are formed into a single integrated circuit, or a single package.

The baseband circuitry 310 can be implemented, for example, as a solder-down substrate including one or more integrated circuits, a single packaged integrated circuit soldered to a main circuit board or a multi-chip module containing two or more integrated circuits.

The platform 300 can also include interface circuitry (not shown) that is used to connect external devices with the platform 300. The external devices connected to the platform 300 via the interface circuitry include sensor circuitry 321 and electro-mechanical components (EMCs) 322, as well as removable memory devices coupled to removable memory circuitry 323.

A battery 330 can power the platform 300, although in some examples the platform 300 can be mounted deployed in a fixed location, and can have a power supply coupled to an electrical grid. The battery 330 can be a lithium ion battery, a metal-air battery, such as a zinc-air battery, an aluminum-air battery, a lithium-air battery, and the like. In some implementations, such as in V2X applications, the battery 330 can be a typical lead-acid automotive battery.

Figure 4:
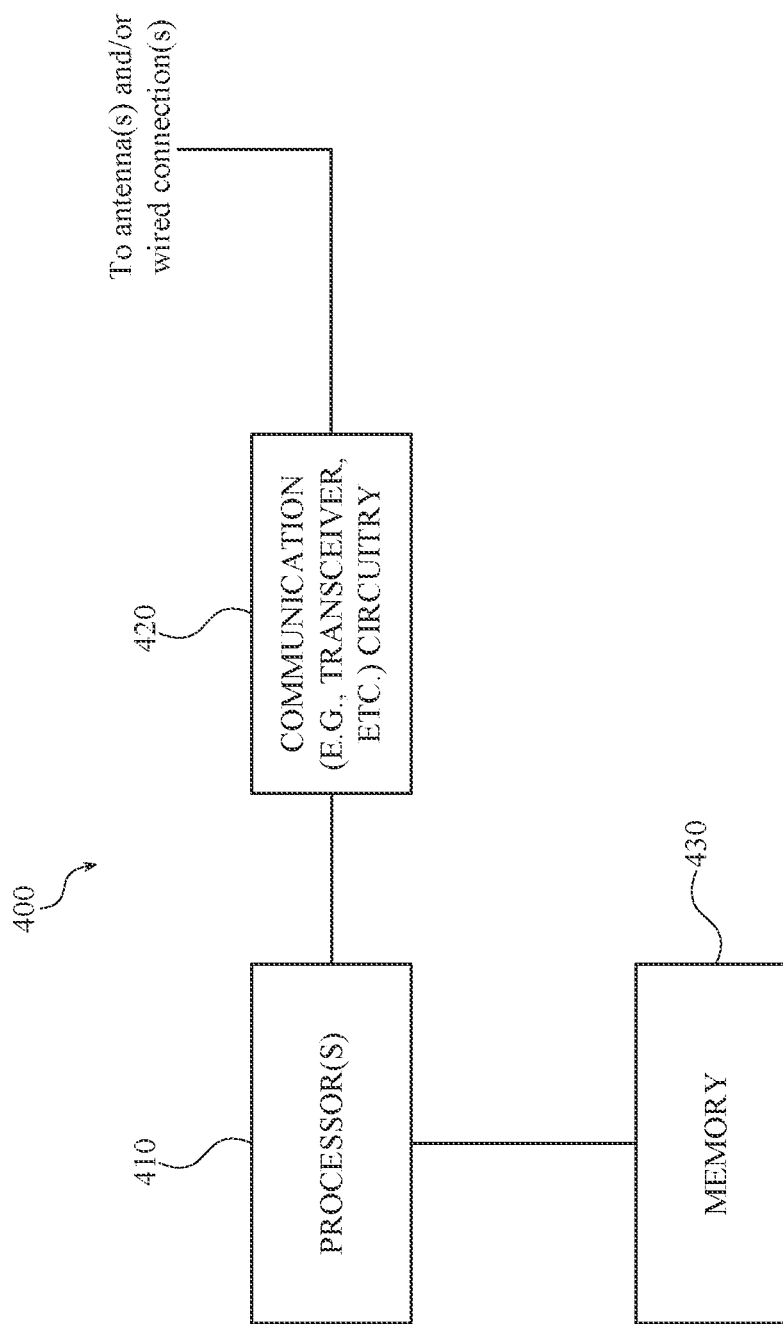
FIG. 4 is a block diagram illustrating a system that facilitates beam failure recovery (BFR) at a Secondary Cell (SCell) or Primary SCell (PSCell), according to various embodiments discussed herein.

Referring to FIG. 4, illustrated is a block diagram of a system 400 employable at a UE (User Equipment), a next generation Node B (gNodeB or gNB) or other BS (base station)/TRP (Transmit/Receive Point), or another component of a 3GPP (Third Generation Partnership Project) network (e.g., a 5GC (Fifth Generation Core Network)) component or function such as a UPF (User Plane Function)) that facilitates operation and maintenance of a Third Generation Partnership Project (3GPP) according to various techniques discussed herein, in various embodiments. System 400 can include processor(s) 410, communication circuitry 420, and memory 430. Processor(s) 410 (e.g., which can comprise one or more processors of FIG. 2 or FIG. 3, etc.) can comprise processing circuitry and associated interface(s). Communication circuitry 420 can comprise, for example circuitry for wired and/or wireless connection(s) (e.g., Radio Front End Module(s) 215 or 315, etc.), which can include transmitter circuitry (e.g., associated with one or more transmit chains) and/or receiver circuitry (e.g., associated with one or more receive chains), wherein transmitter circuitry and receiver circuitry can employ common and/or distinct circuit elements, or a combination thereof). Memory 430 can comprise one or more memory devices (e.g., memory circuitry 220 or 320, removable memory 323, local memory (e.g., including CPU register(s)) of processor(s) discussed herein, etc.) which can be of any of a variety of storage mediums (e.g., volatile and/or non-volatile according to any of a variety of technologies/constructions, etc.), and can store instructions and/or data associated with one or more of processor(s) 410 or transceiver circuitry 420).

Specific types of embodiments of system 400 (e.g., UE embodiments) can be indicated via subscripts (e.g., system $400_{UE}$ comprising processor(s) $410_{UE}$, communication circuitry $420_{UE}$, and memory $430_{UE}$). In some embodiments, such as BS embodiments (e.g., system $400_{gNB}$) and network component (e.g., UPF (User Plane Function), etc.) embodiments (e.g., system $400_{UPF}$) processor(s) $410_{gNB}$ (etc.), communication circuitry (e.g., $420_{gNB}$, etc.), and memory (e.g., $430_{gNB}$, etc.) can be in a single device or can be included in different devices, such as part of a distributed architecture. In embodiments, signaling or messaging between different embodiments of system 400 (e.g., $400_1$ and $400_2$) can be generated by processor(s) $410_1$, transmitted by communication circuitry $420_1$ over a suitable interface or reference point (e.g., a 3GPP air interface, N3, N4, etc.), received by communication circuitry $420_2$, and processed by processor(s) $410_2$. Depending on the type of interface, additional components (e.g., antenna(s), network port(s), etc. associated with system(s) $400_1$ and $400_2$) can be involved in this communication.

In various aspects discussed herein, signals and/or messages can be generated and output for transmission, and/or transmitted messages can be received and processed. Depending on the type of signal or message generated, outputting for transmission (e.g., by processor(s) 410, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping to one or more Resource Elements (REs) (e.g., a scheduled set of resources, a set of time and frequency resources granted for uplink transmission, etc.), wherein each RE can span one subcarrier in a frequency domain and one symbol in a time domain (e.g., wherein the symbol can be according to any of a variety of access schemes, e.g., Orthogonal Frequency Division Multiplexing (OFDM), Single Carrier Frequency Division Multiple Access (SC-FDMA), etc.). Depending on the type of received signal or message, processing (e.g., by processor(s) 410, etc.) can comprise one or more of: identifying physical resources associated with the signal/message, detecting the signal/message, resource element group deinterleaving, demodulation, descrambling, and/or decoding.

In various aspects, one or more of information (e.g., system information, resources associated with signaling, etc.), features, parameters, etc. can be configured to a UE via signaling (e.g., associated with one or more layers, such as L1 signaling or higher layer signaling (e.g., MAC, RRC, etc.)) from a gNB or other access point (e.g., via signaling generated by processor(s) $410_{gNB}$, transmitted by communication circuitry $420_{gNB}$, received by communication circuitry $420_{UE}$, and processed by processor(s) $410_{UE}$). Depending on the type of information, features, parameters, etc., the type of signaling employed and/or the exact details of the operations performed at the UE and/or gNB in processing (e.g., signaling structure, handling of PDU(s)/SDU(s), etc.) can vary. However, for convenience, such operations can be referred to herein as configuring information/feature(s)/parameter(s)/etc. to a UE, generating or processing configuration signaling, or via similar terminology.

A first set of techniques can facilitate optimization of Automatic Neighbor Relations at one or more cells of a RAN. A second set of techniques can facilitate configuration of Physical-layer Cell Identifiers for one or more cells of a RAN. A third set of techniques can facilitate end-to-end performance assurance based on 5G QoS Identifier (5QI) targets and/or requirements, such as for UE to User Plane Function (UPF) connection(s).

As discussed above, a Physical-layer Cell Identifier (PCI), broadcast in PSS and SSS, is used to uniquely identify an NR cell, and there are 1008 unique PCIs (see, e.g., clause 7.4.2 in 3GPP TS 38.211). As a result, PCIs need to be reused, because a significantly larger numbers of NR cells and small cells operating in millimeter wave (mmWave) bands are deployed by operators. Typically, operators use network planning tool to assign PCIs to cells when the network is deployed to ensure all neighboring cells have different PCIs. However, due to the addition of new cells or changes of neighbor relations from ANR functions, problems can arise, such as: (1) PCI collision, wherein two (or more) neighboring cells have the same PCIs; and/or (2) PCI confusion, wherein a cell has two (or more) neighboring cells with the same PCI value (e.g., where Cell #A has a first PCI that is different from the PCIs of its two neighbors, Cell #B and Cell #C, but Cell #B and Cell #C have the same PCI). PCI confusion can impact the handover performance as UEs are confused with which cell they should handover to.

Aspects discussed herein relate to Automatic Neighbor Relation (ANR), ANR optimization, PCI configuration, and associated use cases and capabilities for 5G networks. Various embodiments can facilitate RACH optimization and/or ANR mechanisms to automatically configure RACH parameters and neighbor relations for 5G networks that can generate savings in resource utilization for mobile operators. In some embodiments, the RACH optimization can automatically configure the RACH parameters in a cell in order to achieve the optimal RACH performance by reducing the network access and handoff time, and minimizing failures. In various embodiments, the ANR optimization can be initiated periodically as a preventive maintenance, or when it is detected that the performance of a NR cell is degrading. The ANR optimization can automatically update the neighbor relation table of a Base Station (BS) such as a next generation NodeB (gNB), which can generate savings in resource utilization for mobile operators. Various embodiments can provide end-to-end (e2e) performance assurance, providing a solution to monitor whether 5QI (5G QoS (Quality of Service) Identifier) requirements and/or targets associated with low latency connections that are used to support edge computing applications are met. Specific example embodiments discussed herein relate to use cases of ANR optimization, e2e performance assurance, and PCI configuration. Although these use cases are presented as separate embodiments for the purposes of illustration, it is to be appreciated that various embodiments can perform techniques associated with one or more of ANR optimization, PCI configuration, and end-to-end performance assurance.

Automatic Neighbor Relation (ANR) Optimization

The first set of techniques discussed herein can be employed to facilitate Automatic Neighbor Relation (ANR) optimization in various embodiments (e.g., embodiments employable at a component or service of a 5GC that facilitates Operation and Maintenance, embodiments employable at a Base Station such as a gNB comprising a neighbor relation table (NRT) that can be changed via ANR optimization, etc.).

In various embodiments, an ANR optimization function (e.g., implemented by a component or service of a 5GC, etc.) can have consumed (e.g., be a consumer of the following services): (1) The measurement job control services for Network Slice Instance(s) (NSI(s)) (see clause 7.1 in TS 28.550) with operation createMeasurementJob ("create measurement job," see clause 8.1.2 in TS 28.550) to create a measurement job to monitor the performance of one or more NR cells (e.g., with respect to failed and/or dropped RRC connections, handover failures, etc.) and (2) The generic performance assurance management service with operation subscribe (see clause 7.1.1.3 in TS 28.532) to subscribe to the notification notifyFileReady ("notify file ready") to notify when the file is ready.

The ANR optimization function can be initiated one or more of: periodically as a preventive maintenance, or when it is detected that a cell (e.g., NR Cell #A) is experiencing performance issues (e.g., a higher number of failed and/or dropped RRC connections and/or handover failures, etc.). The ANR optimization function can optimize an ANR function of the cell experiencing performance issues and/or one or more other cells.

Figure 5:
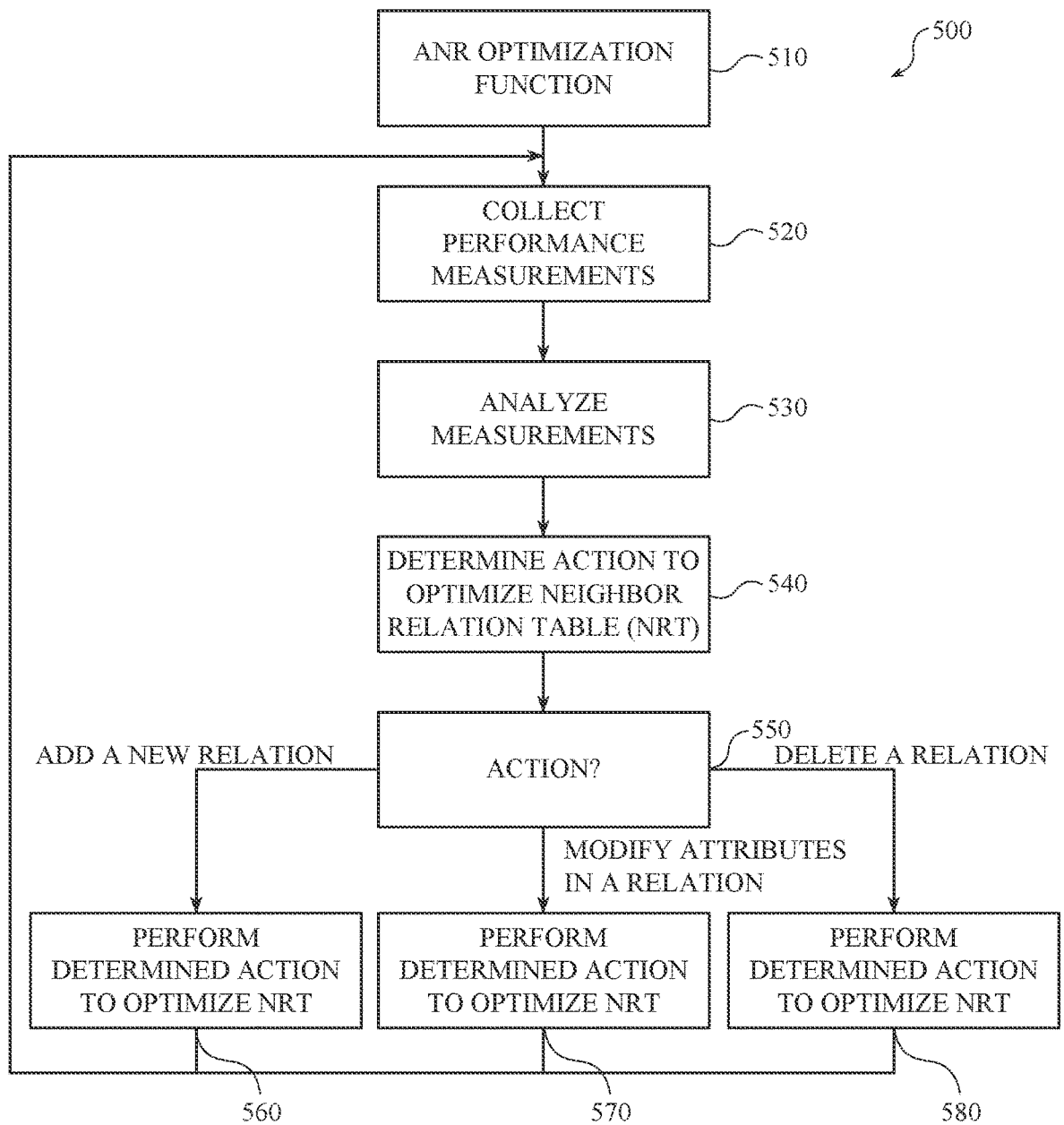
FIG. 5 is a diagram illustrating a two-step RACH procedure in connection with various aspects discussed herein.

Referring to FIG. 5, illustrated is a flow diagram of an example method 500 employable at a component or service of a 5GC that facilitates optimization of an ANR function of a cell in a RAN, according to various embodiments discussed herein. In other aspects, a machine readable medium can store instructions associated with method 500 that, when executed, can cause a component or service (e.g., implementing operation and maintenance) of a 5GC to perform the acts of method 500.

At 510, an ANR optimization function can be initiated for at least one cell of a RAN, for example, as a periodic initiation of the ANR optimization function or based on performance issues being detected at the at least one cell (e.g., a number of failed and/or dropped RRC connections and/or handover failures that exceed a configured or predefined threshold, which can be a threshold specific to the at least one cell or can also apply to one or more additional cells (e.g., all cells sharing one or more characteristics with the at least one cell, all cells, etc.).

At 520, the ANR optimization function can collect performance measurements for neighbor cells and neighbor candidate cells for each cell (e.g., Cell #A) of the at least one cell. In various embodiments, the performance measurements can comprise one or more of the statistics of Reference Signal Received Power (RSRP), Reference Signal Received Quality (RSRQ), or Signal-to-Interference-plus-Noise Ratio (SINR) measurement results that can be generated from the MeasResultListNR ("New Radio Measurement Result List," see, e.g., clause 6.3.2 in 3GPP TS 38.331) for intra-RAT (Radio Access Technology) neighbor relations, or MeasResultListEUTRA ("Evolved Universal Terrestrial Radio Access (E-UTRA) Measurement Result List," see, e.g., clause 6.3.2 in 3GPP TS 38.331) for inter-RAT neighbor relations.

At 530, the ANR optimization function analyzes the performance measurements (e.g., performance data files, etc.).

At 540, based on the analysis, the ANR optimization function can determine whether to update a neighbor relation table (NRT) of that cell. If the ANR optimization function determines not to update the NRT for that cell, method 500 can end for that cell (e.g., and can be restarted based on a periodic condition and/or detected performance issues) and/or restart (e.g., for that cell (e.g., via periodic or threshold-based initiation), for another cell, etc.).

If the ANR optimization function determines to update the NRT for that cell, at 550, an action for updating the neighbor relation table can be determined.

As a first example, for a neighbor candidate cell with strong performance (e.g., RSRP) measurements, a determination can be made that a relation with this neighbor candidate cell is valid, and that neighbor candidate cell can be added to the neighbor relation table, at 550.

As a second example, for a neighbor cell currently in the NRT but for which some information in the NRT (e.g., PCI, etc.) is not current, a determination can be made to update the information for that neighbor cell in the NRT, and one or more attributes of that neighbor cell can be modified in the NRT, at 560.

As a third example, for a neighbor cell with weak performance (e.g., RSRP) measurements, a determination can be made that a relation with this neighbor cell is no longer valid, and that neighbor cell can be deleted from the neighbor relation table, at 570.

To perform actions 550 (add a new relation to the NRT), 560 (modify attributes in a relation in the NRT), or 570 (delete a relation from the NRT), the ANR optimization function can consume one or more of the following operations to execute the action, as appropriate: (1) Operation "createMOI" ("create Managed Object Instance (MOI)," see clause 8.1.2 in TS 28.532) to create an Information Object Class (IOC) NRCellRelation ("New Radio Cell relation," see e.g., clause 4.3.32 in 3GPP TS 28.541) that adds a new relation to the neighbor relation table of the cell (e.g., Cell #A), such as for action 550 (add a new relation to the NRT); (2) Operation "modifyMOIAttributes" ("modify Managed Object Instance (MOI) attributes," see, e.g., clause 8.1.4 in 3GPP TS 28.532) to modify an IOC NRCellRelation that modifies attributes in the neighbor relation table of the cell (e.g., Cell #A), such as for action 560 (modify attribute(s) in a relation in the NRT); or (3) Operation "deleteMOI" ("delete Managed Object Instance (MOI)," see, e.g., clause 8.1.5 in 3GPP TS 28.532) to delete the IOC NRCellRelation that removes the relation from the neighbor relation table of the cell (e.g., Cell #A), such as for action 570 (delete a relation from the NRT).

In embodiments, the IOC NRCellRelation can comprise one or more of the following attributes: (1) isRemoveAllowed ("is remove allowed") that indicates whether this relation is allowed to be removed and (2) isHOAllowed ("is handover (HO) allowed") that indicates whether handover is allowed in this relation.

After performing one of actions 550-570, method 500 can end for that cell (e.g., and can be restarted based on a periodic condition and/or detected performance issues) and/or restart (e.g., for that cell, for another cell, etc.).

Additionally or alternatively, method 500 can include one or more other acts described herein in connection with ANR optimization.

PCI Configuration

As discussed above, a Physical-layer Cell Identifier (PCI), broadcast in PSS and SSS, is used to uniquely identify an NR cell (e.g., a BS such as a gNB, etc.), and there are 1008 unique PCIs (see, e.g., clause 7.4.2 in 3GPP TS 38.211). As a result, PCIs need to be reused, because a significantly larger numbers of NR cells and small cells operating in millimeter wave (mmWave) bands are deployed by operators. Typically, operators use network planning tool to assign PCIs to cells when the network is deployed to ensure all neighboring cells have different PCIs. However, due to the addition of new cells or changes of neighbor relations from ANR functions, problems can arise, such as: (1) PCI collision, wherein two (or more) neighboring cells have the same PCIs; and/or (2) PCI confusion, wherein a cell has two (or more) neighboring cells with the same PCI value (e.g., where Cell #A has a first PCI that is different from the PCIs of its two neighbors, Cell #B and Cell #C, but Cell #B and Cell #C have the same PCI). PCI confusion can impact the handover performance as UEs are confused with which cell they should handover to.

The second set of techniques can facilitate implementation of a PCI configuration function by various embodiments (e.g., embodiments employable at a component or service of a 5GC, etc.), which can be initiated one or more of: periodically as a preventive maintenance, or in response to a determination that a cell experiences poor handover performance (e.g., based on a threshold specific to the at least one cell or also applicable to one or more additional cells (e.g., all cells sharing one or more characteristics with the at least one cell, all cells, etc.), etc.) to detect and mitigate both the PCI collision and PCI confusion without any human intervention.

In various embodiments, a PCI configuration function can be initiated when (a) the PCI configuration function is in operation and (b) 5G NR cells have been assigned PCIs.

Figure 6:
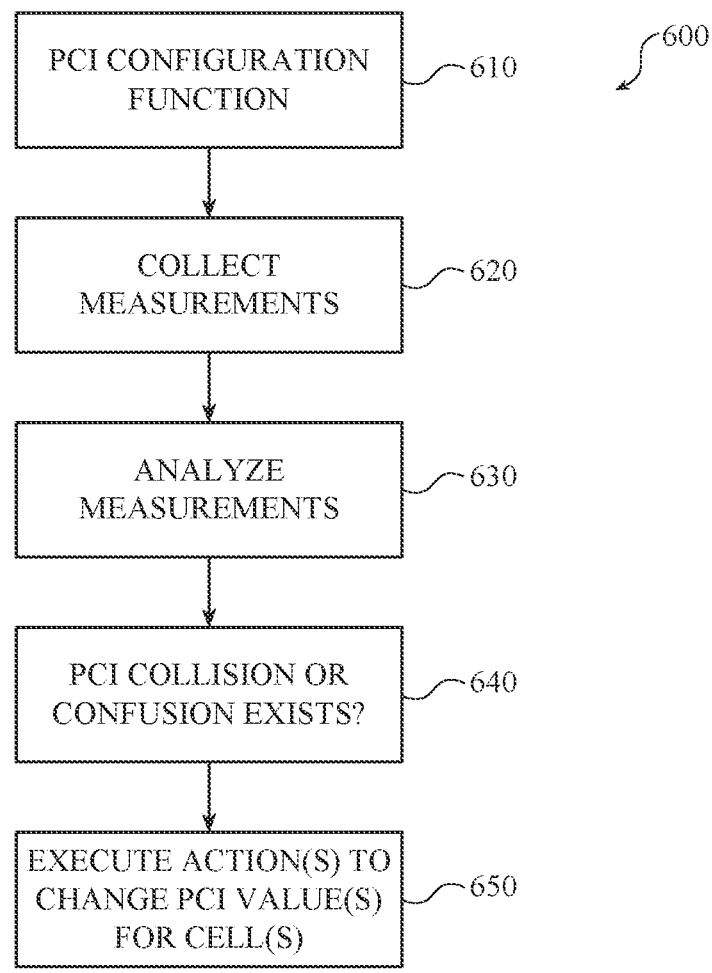
FIG. 6 is a flow diagram illustrating an example method employable at a UE that facilitates Beam Failure Recovery (BFR) via a Message A (MsgA) Physical Uplink Shared Channel (PUSCH) comprising content that facilitates PSCell/SCell BFR, according to various embodiments discussed herein.

Referring to FIG. 6, illustrated is a flow diagram of an example method 600 employable at a component or service of a 5GC that facilitates configuration of PCIs for one or more cells in a RAN, according to various embodiments discussed herein. In other aspects, a machine readable medium can store instructions associated with method 600 that, when executed, can cause a component or service of a 5GC to perform the acts of method 600.

At 610, a PCI configuration function can be initiated for at least one cell of a RAN, for example, as a periodic initiation of the PCI configuration function or based on poor handoff being detected at the at least one cell (e.g., a number of handover failures that exceed a configured or predefined threshold, which can be a threshold specific to the at least one cell or can also apply to one or more additional cells (e.g., all cells sharing one or more characteristics with the at least one cell, all cells, etc.), etc.).

At 620, the PCI configuration function can collect information (e.g., measurements related to measurement report(s), such as physCellId ("physical cell identifier"), MeasQuantityResults ("measurement quantity results"), which are generated from the MeasResultNR (see e.g., clause 6.3.2 in 3GPP TS 38.331)) pertaining to potential PCI conflicts or PCI confusion involving two or more cells of a RAN.

At 630, the PCI configuration function can analyze the information to detect whether there are any PCI conflicts or PCI confusion between the two or more cells of the RAN.

At 640, a determination can be made based on the analyzed information as to whether there are any actual PCI conflicts or PCI confusion. If the PCI configuration function determines there are no PCI conflicts or PCI confusion at a cell, method 600 can end for that cell (e.g., and can be restarted based on a periodic condition and/or detected performance issues) and/or restart (e.g., for that cell (e.g., via periodic or threshold-based initiation), for another cell, etc.).

At 650, a determination can be made as to one or more actions that can mitigate the PCI conflicts and/or PCI confusion issues, and the PCI configuration function can execute the action(s) by changing the PCIs of one or more cells. After 650, the PCIs for the NR cells have been corrected.

Additionally or alternatively, method 600 can include one or more other acts described herein in connection with PCI configuration.

In various aspects, the PCI configuration function can have the following capabilities (e.g., which can, in aspects, be minimum requirements), which can facilitate various embodiments: (1) PCI-CONFIG-x: The PCI configuration function can have a capability to collect information pertaining to PCI conflicts or PCI confusion and (2) PCI-CONFIG-y: The PCI configuration function can have a capability to change the PCIs of one or more cells.

End-to-End Performance Assurance

The third set of techniques can provide a solution to collecting the performance measurements (e.g., latency, data volume) for a UE-to-UPF (User Plane Function) connection that is realized in a NSI (Network Slice Instance). The performance measurements can be used to monitor whether the 5G QoS Identifier (5QI) targets and/or requirements associated with such a connection are met.

Various embodiments (e.g., a 3GPP management system, etc.) can employ the third set of techniques to monitor performance related to end-to-end QoS (e.g., for a UE-to-UPF connection, etc.). The third set of techniques can be employed, for example, in scenarios wherein an authorized consumer (e.g., employing various embodiments) has used the measurement job control services for NSIs (see e.g., clause 7.1 in 3GPP TS 28.550) with operation createMeasurementJob ("create measurement job," see clause 8.1.2 in TS 28.550) to create a measurement job to monitor the end-to-end performance of UE to UPF connection.

The authorized consumer can use the generic performance assurance management service with operation subscribe (see e.g., clause 7.1.1.3 in 3GPP TS 28.532) to subscribe to the notification notifyFileReady.

The performance data reporting related service producer can create the performance data file for end-to-end QoS performance measurements for a given NSI and can send a Notification notifyFileReady (see clause 7.1.1.1 in TS 28.532) to the authorized consumer. In various embodiments, if it is determined that the end-to-end QoS performance measurements for the given NSI do not meet one or more 5QI targets and/or requirements, one or more actions can be taken to improve the end-to-end QoS performance of the UE to UPF connection (e.g., modify existing resources and/or add additional edge computing resources to improve the end-to-end QoS performance of the UE to UPF connection, etc.).

In various embodiments, the end-to-end QoS performance measurements for a NSI can have a subcounter per 5QI. Additionally, in various embodiments, the end-to-end QoS performance measurements can be pre-defined, for example, in 3GPP TS 28.552.

Additional Examples

Examples herein can include subject matter such as a method, means for performing acts or blocks of the method, at least one machine-readable medium including executable instructions that, when performed by a machine (e.g., a processor with memory (e.g., of device/apparatus 200, 300, 400, etc.), an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed in a Fifth Generation Core Network (5GC), comprising: one or more processors configured to: collect, for a cell in a Radio Access Network, performance measurements for a set of other cells associated with the cell, wherein the set of other cells comprise a plurality of neighbor cells of the cell; analyze the performance measurements for the set of other cells; determine, based at least on the analyzed performance measurements for the set of other cells, whether to update a Neighbor Relation Table (NRT) of the cell; and in response to a determination to update the NRT of the cell: determine an action for updating the NRT of the cell; and perform the action for updating the NRT of the cell.

Example 2 comprises the subject matter of any variation of any of example(s) 1, wherein the performance measurements comprise Reference Signal Received Power (RSRP) measurements for each cell of the set of other cells associated with the cell.

Example 3 comprises the subject matter of any variation of any of example(s) 1-2, wherein the set of other cells associated with the cell further comprise one or more neighbor candidate cells for the cell.

Example 4 comprises the subject matter of any variation of any of example(s) 3, wherein the action comprises adding a first neighbor candidate cell of the one or more neighbor candidate cells to the NRT of the cell.

Example 5 comprises the subject matter of any variation of any of example(s) 1-2, wherein the action comprises modifying, for a first other cell of the set of other cells, at least one attribute associated with the first other cell in the NRT of the cell.

Example 6 comprises the subject matter of any variation of any of example(s) 1-2, wherein the action comprises deleting a first neighbor cell of the plurality of neighbor cells from the NRT of the cell.

Example 7 comprises the subject matter of any variation of any of example(s) 1-6, wherein the one or more processors are configured to collect the performance measurements at least periodically.

Example 8 comprises the subject matter of any variation of any of example(s) 1-7, wherein the one or more processors are configured to collect the performance measurements based at least in response to detecting one or more performance issues at the cell.

Example 9 comprises the subject matter of any variation of any of example(s) 1-8, wherein the one or more processors are configured to collect the performance measurements based at least in response to a measurement job being created via a createMeasurementJob operation.

Example 10 comprises the subject matter of any variation of any of example(s) 1-9, wherein the one or more processors are configured to collect the performance measurements based at least in response to processing a notifyFileReady notification.

Example 11 is an apparatus configured to be employed in a Fifth Generation Core Network (5GC), comprising: one or more processors configured to: collect information associated with one or more potential Physical-layer Cell Identifier (PCI) conflicts or potential PCI confusions for a plurality of cells of a RAN; analyze the information associated with the one or more potential PCI conflicts or potential PCI confusions for the plurality of cells of the RAN; determine, based on the analyzed information, whether there are one or more actual PCI conflicts or actual PCI confusions for the plurality of cells of the RAN; and in response to a determination that there are one or more actual PCI conflicts or actual PCI confusions for the plurality of cells of the RAN, mitigate the one or more actual PCI conflicts or actual PCI confusions via changing at least one PCI for at least one cell of the plurality of cells of the RAN.

Example 12 comprises the subject matter of any variation of any of example(s) 11, wherein the information associated with the one or more potential PCI conflicts or potential PCI performance measurements comprises a plurality of PCIs associated with the plurality of cells of the RAN.

Example 13 comprises the subject matter of any variation of any of example(s) 11-12, wherein the information associated with the one or more potential PCI conflicts or potential PCI performance measurements comprises measurement quantity results associated with the plurality of cells of the RAN.

Example 14 comprises the subject matter of any variation of any of example(s) 13, wherein the measurement quantity results associated with the plurality of cells of the RAN comprise one or more of Reference Signal Received Power (RSRP) values associated with the plurality of cells of the RAN, Reference Signal Received Quality (RSRQ) values associated with the plurality of cells of the RAN, or Signal-to-Interference-plus-Noise Ratio (SINR) values associated with the plurality of cells of the RAN.

Example 15 comprises the subject matter of any variation of any of example(s) 11-14, wherein the one or more processors are configured to collect the information associated with the one or more potential PCI conflicts or potential PCI confusions for the plurality of cells of the RAN at least periodically.

Example 16 comprises the subject matter of any variation of any of example(s) 11-15, wherein the one or more processors are configured to collect the information associated with the one or more potential PCI conflicts or potential PCI confusions for the plurality of cells of the RAN based at least in response to detecting one or more handover performance issues for the plurality of cells of the RAN.

Example 17 comprises the subject matter of any variation of any of example(s) 11-16, wherein the one or more actual PCI conflicts comprise a first actual PCI conflict, and wherein, in the first actual PCI conflict, a first cell of the plurality of cells of the RAN has a first PCI, a second cell of the plurality of cells of the RAN has the first PCI, and the first cell and the second cell neighbor each other.

Example 18 comprises the subject matter of any variation of any of example(s) 11-17, wherein the one or more actual PCI confusions comprise a first actual PCI confusion, and wherein, in the, in the first actual PCI confusion, a first cell of the plurality of cells of the RAN has a first PCI, a second cell of the plurality of cells of the RAN has the first PCI, and the first cell and the second cell neighbor each neighbor a third cell of the plurality of cells of the RAN.

Example 19 is an apparatus configured to be employed in a Third Generation Partnership Project (3GPP) Management System, comprising: one or more processors configured to: create a measurement job to monitor the end-to-end Quality of Service (QoS) performance of a User Equipment (UE) to User Plane Function (UPF) connection; subscribe to a notification associated with the measurement job; and receive a performance data file comprising end-to-end performance measurements for the UE to UPF connection.

Example 20 comprises the subject matter of any variation of any of example(s) 19, wherein the one or more processors are further configured to determine whether the end-to-end performance measurements for the UE to UPF connection meet one or more Fifth Generation (5G) QoS Identifier (5QI) targets associated with the UE to UPF connection.

Example 21 comprises the subject matter of any variation of any of example(s) 20, wherein, in response to a determination that the end-to-end performance measurements do not meet the one or more 5QI targets associated with the UE to UPF connection, perform at least one action to improve the end-to-end QoS performance of the UE to UPF connection.

Example 22 comprises an apparatus comprising means for executing any of the described operations of examples 1-21.

Example 23 comprises a machine readable medium that stores instructions for execution by a processor to perform any of the described operations of examples 1-21.

Example 24 comprises an apparatus comprising: a memory interface; and processing circuitry configured to: perform any of the described operations of examples 1-21.

The following are additional example embodiments.

Example A01 includes an ANR optimization function to be operated by one or more processors, the ANR optimization function configured to: create a measurement job to monitor the NR cell performance (e.g., failed/dropped RRC connections, handover failures, etc); subscribe to receive a notification notifyFileReady notification when the performance data is ready; and collect the performance measurements for NR cell(s).

Example A02 includes the ANR optimization function of example A01 and/or some other example(s) herein, wherein the ANR optimization function can be initiated periodically as a preventive maintenance, or when it is detected that a given cell is experiencing performance issues.

Example A03 includes the ANR optimization function of example A02 and/or some other example(s) herein, wherein the ANR optimization function is configured to: collect the performance measurements for neighbor cells and neighbor candidate cells of a cell having issues or under preventive maintenance; and analyze the performance data to determine if neighbor relation table needs to be updated, and if so, determines the action for neighbor relation table update; or execute the action to update the table.

Example A04 includes the ANR optimization function of example A03 and/or some other example(s) herein, wherein the performance measurements is the statistics of RSRP measurement results that can be generated from the MeasResultListNR (see clause 6.3.2 in TS 38.331) for intra-RAT neighbor relations, or MeasResultListEUTRA (see clause 6.3.2 in TS 38.331) for inter-RAT neighbor relations.

Example A05 includes the ANR optimization function of examples A03 and A04 and/or some other example(s) herein, wherein a neighbor cell with weak RSRP measurements may indicate that a relation with this neighbor cell is no longer valid, and can be deleted from the neighbor relation table update.

Example A06 includes the ANR optimization function of examples A03, A04, and/or some other example(s) herein, wherein a neighbor candidate cell with strong RSRP measurements may indicate that a relation with this neighbor candidate cell is valid, and should be added to the neighbor relation table.

Example A07 includes the ANR optimization function of examples A03, A04, A05, A06, and/or some other example(s) herein, wherein the ANR optimization function is configured to: add a new relation to the neighbor relation table by using Operation "createMOI" to create an IOC NRCellRelation; modify an attribute in the neighbor relation table by using Operation "modifyMOIAttributes" to modify an IOC NRCellRelation; or remove the relation from the neighbor relation table by using Operation "deleteMOI" to delete the IOC NRCellRelation.

Example A08 includes a PCI configuration function to be operated by one or more processors, wherein the PCI configuration function is configured to: collect the information pertaining to PCI conflicts or PCI confusion; analyze the information to detect PCI conflicts or PCI confusion;

determine the action to mitigate the PCI conflicts or PCI confusion issue; and execute the action by changing the PCIs of one or more cells.

Example A09 includes the PCI configuration function of example A08 and/or some other example(s) herein, wherein PCI collision refers to two neighboring cells have the same PCIs.

Example A10 includes the PCI configuration function of example A08 and/or some other example(s) herein, wherein PCI confusion: a cell has 2 neighboring cells with the same PCI value, where Cell #A has PCI that is different from the PCIs of its two neighbors—Cell #B and Cell #C, but Cell #B and Cell #C have the same PCI.

Example A11 includes a 3GPP management system supported by one or more processors, the one or more processors configured to: use the measurement job control services for NSIs with operation createMeasurementJob to create a measurement job to monitor the end-to-end performance of UE to UPF connections; use the generic performance assurance management service with operation subscribe to subscribe to the notification notifyFileReady; receive a Notification notifyFileReady indicating the performance data file is ready; and retrieve the performance data file.

Example A12 includes the 3GPP management system of example A11 and/or some other example(s) herein, wherein the PM job is to collect the end-to-end QoS performance measurements for a NSI that should have subcounter per 5QI.

Example B01 includes an ANR optimization method comprising: creating or causing to create a measurement job for monitoring cell performance of one or more cells provided by one or more Radio Access Network (RAN) nodes; subscribing or causing to subscribe to receive a notifyFileReady notification when performance data is generated, the performance data being generated according to the measurement job; and collecting or causing to collect performance measurements for the one or more cells.

Example B02 includes the method of example B01 and/or some other example(s) herein, wherein the cell performance to be measured by the measurement job includes measuring one or more of radio link failure events, failed or dropped RRC connections, and handover failures.

Example B03 includes the method of examples B01-B02 and/or some other example(s) herein, wherein creating the measurement job comprises detecting or causing to detect a trigger to initiate an ANR optimization function, wherein the trigger is triggered periodically or the trigger comprises detection of cell performance degredation of one or more cells.

Example B04 includes the method of example B03 and/or some other example(s) herein, further comprising: collecting or causing to collect the performance measurements for neighbor cells and neighbor candidate cells of a cell; and analyzing or causing to analyze the performance data to determine if a neighbor relation table needs to be updated.

Example B05 includes the method of example B04 and/or some other example(s) herein, wherein, when the neighbor relation table is determined to need to be updated, the method further comprises: determining or causing to determine an action for updating the neighbor relation table; and/or executing or causing to be executed the action to update the neighbor relation table.

Example B06 includes the method of examples B04-B05 and/or some other example(s) herein, wherein the performance measurements include statistics of RSRP measurement results that can be generated from a MeasResultListNR for intra-RAT neighbor relations and/or MeasResultListEUTRA for inter-RAT neighbor relations.

Example B07 includes the method of examples B05-B06 and/or some other example(s) herein, wherein a neighbor cell with relatively weak RSRP measurements indicates that a relation with the neighbor cell is no longer valid, and executing the action comprises deleting or causing to delete a neighbor relation with the neighbor cell from the neighbor relation table.

Example B08 includes the method of examples B04-B07 and/or some other example(s) herein, wherein a neighbor candidate cell with relatively strong RSRP measurements indicates that a relation with the neighbor candidate cell is valid, and executing the action comprises adding or causing to add a neighbor relation with the neighbor candidate cell to the neighbor relation table.

Example B09 includes the method of examples B04-B08 and/or some other example(s) herein, further comprising: adding or causing to add a new relation to the neighbor relation table via a createMOI operation to create an IOC NRCellRelation; modifying or causing to modify an attribute in the neighbor relation table via a modifyMOIAttributes operation to modify an IOC NRCellRelation; and/or removing or causing to remove a relation from the neighbor relation table by using a deleteMOI operation to delete the IOC NRCellRelation.

Example B10 includes a PCI configuration method comprising: collecting or causing to collect information pertaining to PCI conflicts and/or PCI confusion from one or more cells provided by one or more Radio Access Network (RAN) nodes; analyzing or causing to analyze the information to detect PCI conflicts and/or PCI confusion; determining or causing to determine an action to mitigate the PCI conflicts and/or PCI confusion issue based on the analyzing; and executing or causing to execute the action by changing PCIs of the one or more cells.

Example B11 includes the method of example B10 and/or some other example(s) herein, wherein the PCI collision includes two or more neighboring cells having a same PCI.

Example B12 may include the method of examples B10-B11 and/or some other example(s) herein, wherein the PCI confusion involves a cell having two or more neighboring cells with a same PCI value, wherein a first cell has a PCI that is different from PCIs of the two more neighboring cells, and the two or more neighboring cells have a same PCI.

Example B13 includes a method to be performed by a management system, the method comprising: using or causing to use measurement job control services for NSIs via a createMeasurementJob operation to create a measurement job to monitor end-to-end performance of one or more user equipment to User Plane Function (UE-UPF) connections; using or causing to use a generic performance assurance management service via a subscribe operation to subscribe to a notifyFileReady notification; receiving a notifyFileReady notification indicating that a performance data file is ready; and retrieving or causing to retrieve the performance data file.

Example B14 includes the method of example B13 and/or some other example(s) herein, wherein the measurement job is for collecting end-to-end QoS performance measurements for an NSI that has a subcounter per 5QI.

Example Z01 may include an apparatus comprising means to perform one or more elements of a method described in or related to any of examples A01-A12, B01-B14, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples A01-A12, B01-B14, or any other method or process described herein.

Example Z03 may include an apparatus comprising logic, modules, or circuitry to perform one or more elements of a method described in or related to any of examples A01-A12, B01-B14, or any other method or process described herein.

Example Z04 may include a method, technique, or process as described in or related to any of examples A01-A12, B01-B14, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples A01-A12, B01-B14, or portions thereof.

Example Z06 may include a signal as described in or related to any of examples A01-A12, B01-B14, or portions or parts thereof.

Example Z07 may include a datagram, packet, frame, segment, protocol data unit (PDU), or message as described in or related to any of examples A01-A12, B01-B14, or portions or parts thereof, or otherwise described in the present disclosure.

Example Z08 may include a signal encoded with data as described in or related to any of examples A01-A12, B01-B14, or portions or parts thereof, or otherwise described in the present disclosure.

Example Z09 may include a signal encoded with a datagram, packet, frame, segment, protocol data unit (PDU), or message as described in or related to any of examples A01-A12, B01-B14, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples A01-A12, B01-B14, or portions thereof.

Example Z11 may include a computer program comprising instructions, wherein execution of the program by a processing element is to cause the processing element to carry out the method, techniques, or process as described in or related to any of examples A01-A12, B01-B14, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An apparatus configured to be employed in a Core Network of a wireless system, comprising:
one or more processors configured to:
collect, for a cell in a Radio Access Network, performance measurements of a plurality of neighbor cells of the cell;
determine, based at least on the performance measurements of the plurality of neighbor cells, whether to update a Neighbor Relation Table (NRT) of the cell; and
perform, in response to a determination to update the NRT of the cell, an action for updating the NRT of the cell;
wherein collecting the performance measurements is at least in response to determining that a number of failed radio resource control (RRC) connections or hand over failures from a combination of the cell and one or more additional cells exceeds a threshold number.

2. The apparatus of claim 1, further comprising collecting performance measurements of one or more neighbor candidate cells.

3. The apparatus of claim 2, wherein the action comprises adding a first neighbor candidate cell of the one or more neighbor candidate cells to the NRT of the cell.

4. The apparatus of claim 3, wherein the action for adding a first neighbor candidate cell to the NRT of the cell is executed by using a createMOI operation.

5. The apparatus of claim 1, wherein the action comprises modifying, for a first other cell of the plurality of neighbor cells, at least one attribute associated with the first other cell in the NRT of the cell.

6. The apparatus of claim 5, wherein the action for modifying the at least one attribute associated with the first other cell in the NRT of the cell is executed by using a modifyMOIAttributes operation.

7. The apparatus of claim 1, wherein the action comprises deleting a first neighbor cell of the plurality of neighbor cells from the NRT of the cell.

8. The apparatus of claim 7, wherein the action for deleting the first neighbor cell from the NRT of the cell is executed by using a deleteMOI operation.

9. The apparatus of claim 1, wherein the one or more processors are configured to collect the performance measurements based at least in response to a measurement job being created via a createMeasurementJob operation.

10. The apparatus of claim 1, wherein the one or more processors are configured to collect the performance measurements based at least in response to processing a notifyFileReady notification.

11. A method for a Core Network of a wireless system, the method comprising:
   detecting a number of failed radio resource control (RRC) connections or hand over failures from a combination of a cell in a Radio Access Network and one or more additional cells that share one or more characteristics with the cell that exceeds a threshold number;
   initiating an automatic neighbor relation (ANR) optimization function at least in response to detecting the number of failed RRC connections or hand over failures that exceeds the threshold number, the ANR optimization function comprising:
   collecting, for the cell, performance measurements of a plurality of neighbor cells of the cell;
   determining, based at least on the performance measurements of the plurality of neighbor cells, whether to update a Neighbor Relation Table (NRT) of the cell; and
   performing, in response to a determination to update the NRT of the cell, an action for updating the NRT of the cell.

12. The method of claim 11, further comprising collecting performance measurements of one or more neighbor candidate cells that are not on the NRT of the cell.

13. The method of claim 11, wherein the performance measurements comprise one or more Reference Signal Received Quality (RSRQ) measurements for each cell of the plurality of neighbor cells associated with the cell.

14. The method of claim 11, wherein the performance measurements comprise one or more Signal-to-Interference-plus-Noise Ratio (RSRP) measurements for each cell of the plurality of neighbor cells associated with the cell.

15. The method of claim 11, wherein the NRT comprises a plurality of cell relations that comprise attributes of relations between the plurality of neighbor cells and the cell.

16. The method of claim 15, wherein the attributes comprise an isRemoveAllowed attribute that indicates whether the action may delete a corresponding neighbor cell from the NRT of the cell.

17. The method of claim 15, wherein the attributes comprise an isHOAAllowed attribute that indicates whether handover may occur between the cell and a corresponding neighbor cell.

18. The method of claim 11, wherein the determination of whether to update the NRT of the cell is further based on whether or not information in the NRT is current.

19. The method of claim 18, wherein the information in the NRT that is checked includes a Physical-layer Cell Identifier (PCI).

20. A non-transitory computer-readable media comprising instructions to cause an electronic device configured to be employed in a Core Network of a wireless system, upon execution of the instructions by one or more processors of the electronic device, to perform operations comprising:
   collecting, for a cell in a Radio Access Network, performance measurements of a plurality of neighbor cells of the cell;
   determining, based at least on the performance measurements of the plurality of neighbor cells, whether to update a Neighbor Relation Table (NRT) of the cell; and
   performing, in response to a determination to update the NRT of the cell, an action for updating the NRT of the cell;
   wherein collecting the performance measurements is at least in response to determining that a number of failed radio resource control (RRC) connections or hand over failures from a combination of the cell and one or more additional cells exceeds a threshold number.

* * * * *